United States Patent [19]
Snyder

[11] Patent Number: 5,591,459
[45] Date of Patent: Jan. 7, 1997

[54] APPARATUS FOR REINFORCING A FIBER PRODUCING SPINNER

[75] Inventor: James G. Snyder, Newark, Ohio

[73] Assignee: Owens Corning Fiberglas Technology, Inc., Summit, Ill.

[21] Appl. No.: 395,542

[22] Filed: Feb. 28, 1995

[51] Int. Cl.[6] .................................................. B29B 9/00
[52] U.S. Cl. ............................. 425/8; 65/521; 264/8; 425/192 R; 425/192 S; 425/72.2
[58] Field of Search ............................. 65/516, 521, 520; 425/8, 6, 72.2, 190, 192 R, 192 S; 264/8

[56] References Cited

U.S. PATENT DOCUMENTS

| | | | |
|---|---|---|---|
| 2,899,728 | 8/1959 | Gibbons | 425/8 |
| 3,511,306 | 5/1970 | Warkoczewski | 65/521 |
| 4,294,783 | 10/1981 | Snowden | 425/8 |
| 4,430,106 | 2/1984 | Goodridge . | |
| 4,511,383 | 4/1985 | Bhatti . | |
| 4,904,290 | 2/1990 | Gaul et al. . | |
| 5,100,450 | 3/1992 | Cunningham | 264/8 |
| 5,474,590 | 12/1995 | Lin | 425/8 |

*Primary Examiner*—Khanh P. Nguyen
*Attorney, Agent, or Firm*—C. Michael Gegenheimer; Curtis B. Brueske

[57] ABSTRACT

Apparatus is provided for extending the life of spinners by means of reinforcement which includes a plurality of arms secured to the bottom wall of a spinner either individually or via an annular plate from which the arms extend. The reinforcement applies a radially inward force on a flange extending from the top or center of an outer sidewall of the spinner. The arms exert the radial force as the result of offset cams, due to a prestressed condition which is released after the reinforcement is installed in a spinner or otherwise. If the spinner includes both a center flange and an upper flange, the reinforcement may be installed to engage the center flange with gussets interconnecting the center flange and the upper flange at least at locations corresponding to the reinforcement to thereby provide reinforcement for both flanges. If the reinforcement is formed integrally as an annular plate with arms extending therefrom, the flange to be directly reinforced can be notched to receive the reinforcement by a bayonet coupling motion.

12 Claims, 4 Drawing Sheets

APPARATUS FOR REINFORCING A FIBER PRODUCING SPINNER

BACKGROUND OF THE INVENTION

The present invention relates in general to the production of fibers from molten materials, such as molten glass, by rotating a spinner to centrifuge the fibers from the molten material and, more particularly, to a method and apparatus for reinforcing such a fiber producing spinner.

It is a common practice in industry to produce fibers of a variety of materials including polymers, glass and minerals such as rock, slag and basalt by injecting molten material into a rotating centrifuge referred to as a spinner. The molten material then emerges through orifices in an outer sidewall of the spinner as fibers of the material.

The spinners are made of alloys which exhibit high temperature strength, creep resistance, oxidation resistance and corrosion resistance to the material being fiberized. Unfortunately, spinners made of even the best currently available alloys have a limited lifetime due to corrosion and deformation of the spinners.

Accordingly, there is a need to extend the lifetime of spinners to thereby reduce costs of manufacturing such fibers by reducing spinner replacement frequency as well as down time and labor required for replacing spinners which can no longer produce acceptable fibers.

SUMMARY OF THE INVENTION

This need is met by the present invention wherein a method and apparatus are provided for extending the life of spinners by means of reinforcement of the spinners. A reinforcement, comprising a plurality of arms which are secured to the bottom wall of a spinner either individually or via an annular plate from which the arms extend, applies a radially inward force on a flange extending from the top or center of an outer sidewall of the spinner. The arms exert the radial force as the result of offset cams, due to a prestressed condition which is released after the reinforcement is installed in a spinner or otherwise. If the spinner includes both a center flange and an upper flange, the reinforcement may be installed to engage the center flange with gussets interconnecting the center flange and the upper flange at least at locations corresponding to the reinforcement to thereby provide reinforcement for both flanges. If the reinforcement is formed integrally as an annular plate with arms extending therefrom, the flange to be directly reinforced can be notched to receive the reinforcement by a bayonet coupling motion.

In accordance with one aspect of the present invention, a spinner for receiving molten material and for generating fibers of the molten material by means of rotation of the spinner is provided. The spinner comprises a spinner body having a bottom wall, an outer sidewall extending upwardly from the periphery of the bottom wall around a center of the spinner body, and a generally horizontal flange extending inwardly from the outer sidewall. The outer sidewall has orifices through which molten material flows. A reinforcement is secured to the bottom wall of the spinner and engages the generally horizontal flange. The reinforcement is configured to exert an inward force on the generally horizontal flange toward the center of the spinner body.

In one embodiment, the reinforcement defines offset cams which operate to exert the inward force on the generally horizontal flange when the reinforcement is secured to the bottom wall of the spinner. In another embodiment, the reinforcement is secured to the bottom wall in a prestressed state and exerts the inward force on the generally horizontal flange when the prestressed state is released.

The generally horizontal flange may extend from a top of the outer sidewall or near a center of the outer sidewall. If the generally horizontal flange extends from near a center of the outer sidewall, the spinner may further comprise an upper generally horizontal flange extending from a top of the outer sidewall. To reinforce both the upper generally horizontal flange, the reinforcement directly engages the generally horizontal flange and gussets may extend between the generally horizontal flange and the upper generally horizontal flange. Preferably, the reinforcement engages the generally horizontal flange at a plurality of locations around the generally horizontal flange and the gussets are positioned at the plurality of locations.

It is currently preferred to form the reinforcement as an annular plate secured to the bottom wall and a plurality of arms extending between the plate and the generally horizontal flange. The generally horizontal flange comprises a downwardly extended portion and is notched to receive the plurality of arms of the reinforcement. For this embodiment, the reinforcement is rotated to engage the arms with the downwardly extended portion of the generally horizontal flange in bayonet fashion. However, the reinforcement may also comprise a plurality of arms extending between the bottom wall of the spinner and the generally horizontal flange.

In accordance with another aspect of the present invention, a reinforcement for a spinner body having a bottom wall, an apertured outer sidewall extending upwardly from the periphery of the bottom wall for generating fibers of molten material during rotation of the spinner, and a generally horizontal flange extending inwardly from the outer sidewall, comprises a reinforcement secured to the bottom wall of the spinner and engaging the generally horizontal flange. The reinforcement may comprise a plurality of arms extending between the bottom wall of the spinner and the generally horizontal flange. For this embodiment, the reinforcement may further comprise an annular plate secured to the bottom wall, the plurality of arms being secured to the annular plate. Preferably, the plurality of arms and the annular plate are integrally formed to define the reinforcement.

In accordance with yet another aspect of the present invention, a method of reinforcing a spinner body having a bottom wall, an apertured outer sidewall extending upwardly from the periphery of the bottom wall for generating fibers of molten material during rotation of the spinner, and a generally horizontal flange extending inwardly from the outer sidewall comprises the steps of: engaging a reinforcement with the generally horizontal flange; and, securing the reinforcement to the bottom wall to exert an inward force on the generally horizontal flange. When the generally horizontal flange extends from near a center of the outer sidewall and the spinner body further comprises an upper generally horizontal flange extending from a top of the outer sidewall, the method may further comprise the step of extending gussets between the generally horizontal flange and the upper generally horizontal flange. If the reinforcement comprises a plurality of arms engaging the generally horizontal flange at a corresponding plurality of locations around the generally horizontal flange, the step of extending gussets between the generally horizontal flange and the upper generally horizontal flanges may be performed at the plurality of locations around the generally horizontal flange.

It is thus an object of the present invention to provide a method and apparatus for extending the life of spinners by means of reinforcement of the spinners; to provide a method and apparatus for extending the life of spinners by means of reinforcement of the spinners to exert a radial inward force on one or more generally horizontal flanges of the spinners; and, to provide a method and apparatus for extending the life of spinners by means of reinforcement of the spinners to exert a radial inward force on one or more generally horizontal flanges of the spinners wherein the reinforcement extends between the bottom wall of the spinner and the lowermost flange of the spinner to be reinforced.

Other objects and advantages of the invention will be apparent from the following description, the accompanying drawings and the appended claims.

DETAILED DESCRIPTION OF THE INVENTION

Figure 1:
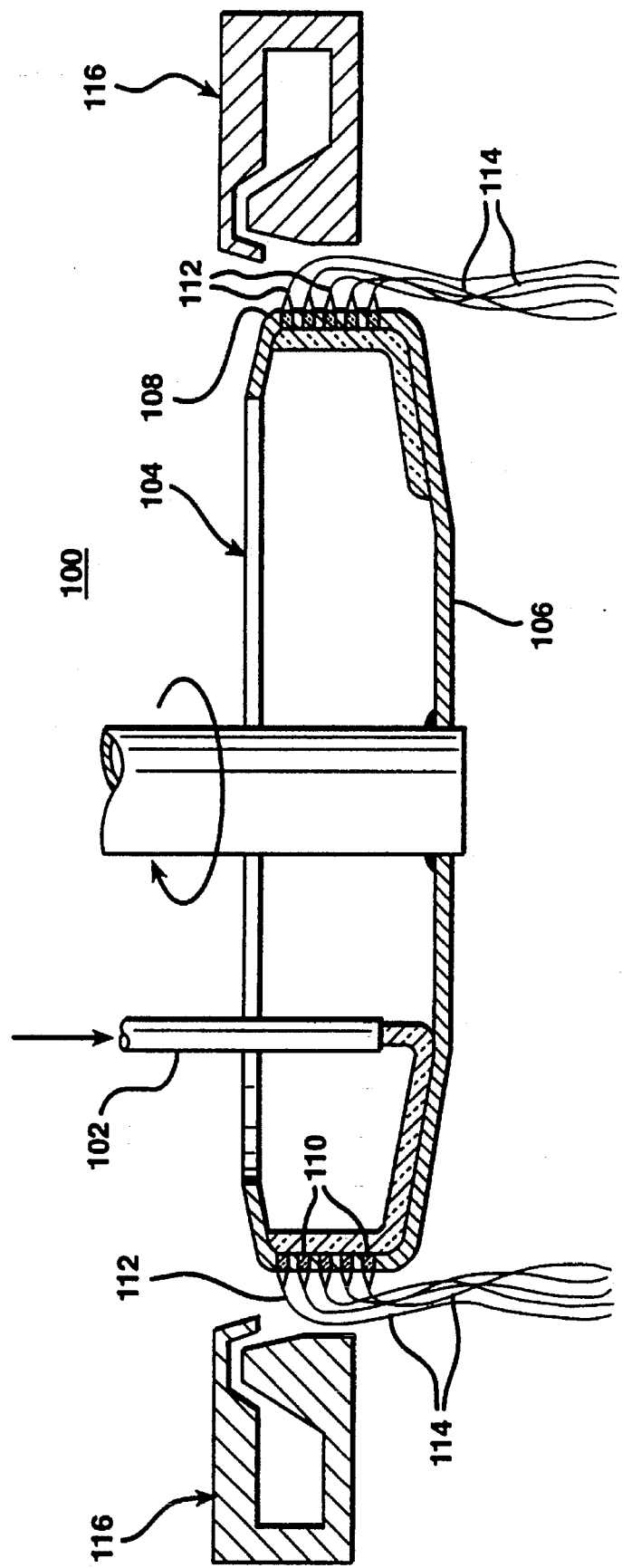
FIG. 1 is a schematic cross sectional view of a single-material rotating fiberizer/spinner system for forming fibers from a molten material for which the present invention is applicable as shown in FIG. 2.

The invention will be described with reference to the drawing figures wherein FIG. 1 is a schematic cross sectional view of a single-material rotating fiberizer/spinner system 100 for forming fibers from a single molten material. While the invention of the present application is generally applicable to spinners for a variety of materials, such as polymeric fibers, glass or mineral fibers made from rock, slag or basalt, it will be described with reference to glass fibers for which it is particularly applicable and will first be applied.

As shown in FIG. 1, molten glass 102 is supplied to a rotating spinner body or spinner 104. The molten glass 102 impinges on the bottom wall 106 of the spinner 104 and flows outwardly by centrifugal force to the spinner peripheral wall 108 which contains orifices 110 through which streams 112 of the molten glass 102 emanate. The relative motion of the streams 112 of molten glass 102 emanating from the spinner 104 and the air surrounding the spinner 104 result in a quenching of the molten streams into glass fibers 114. Other methods of controlling the quench rate include the use of external air sources, baffles or a heat source such as an annular burner, not shown. An annular blower 116 can be positioned concentrically around the spinner 104 to turn the fibers 114 downward for collection of the fibers 114.

Figure 4:
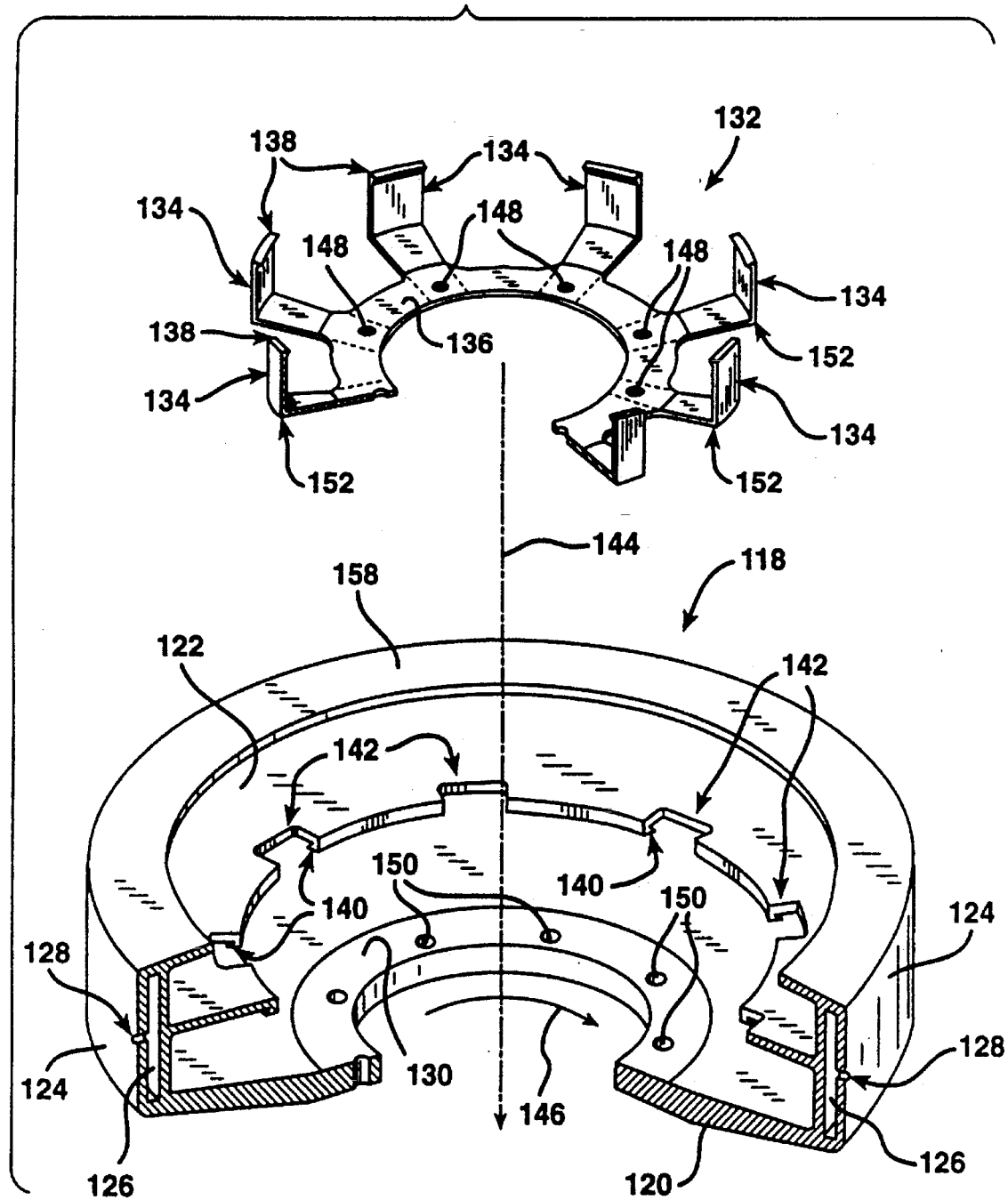
FIG. 4 is a partially cut-away perspective exploded view of a two-material rotating spinner and reinforcement in accordance with the present invention illustrating insertion/removal of the reinforcement.

Another form of spinner is illustrated in FIG. 4 wherein a spinner body or spinner 118 is formed to fiberize or spin fibers from two different materials, glass as illustrated. Molten glass of a first composition impinges on the bottom wall 120 while molten glass of a second composition impinges on a generally horizontal flange 122 which extends from near a center of an outer sidewall 124. The two molten glass compositions flow into alternating adjacent compartments 126 so that every other compartment contains glass of the first composition while the remaining compartments contain glass of the second composition. The outer sidewall 124 has orifices 128 which receive molten glass from two adjacent ones of the compartments 126 to form a dual-glass fiber, i.e. a glass formed of both first and second compositions of glass. The spinner 118 includes an annular mounting hub 130 by which the spinner 118 is supported for rotation.

For additional information regarding the spinner 118 and its operation see U.S. patent application Ser. No. 08/309,706, which was filed Sep. 21, 1994, is entitled HOLLOW MULTI-COMPONENT INSULATION FIBERS AND THE MANUFACTURING OF SAME, is assigned to the same assignee as the present application, and is incorporated by reference herein.

Spinners, such as the spinners 104 and 118, are made of alloys which exhibit high temperature strength, creep resistance, oxidation resistance and corrosion resistance to the material being fiberized, here glass. Unfortunately, spinners made of even the best currently available alloys have a limited lifetime due to corrosion and deformation of the spinners. Since the cost of producing a given mass of fibers is directly related to the number of spinners which are "used up" to produce that mass of fibers, it is apparent that extending the life of spinners can reduce the cost of fibers. If the life of spinners is extended, the cost of fibers is further reduced because of reduced down-time for changing spinners as well as the labor costs involved.

The life of a spinner is extended by the present invention wherein a reinforcement, such as a reinforcement 132 as shown in FIG. 4, is secured to the spinner. The reinforcement is made of material which is the same as or similar to the material used to make the spinner 118 to provide thermal match at operating temperatures. As illustrated in FIG. 4, the reinforcement 132 comprises a plurality of generally L-shaped arms 134 which extend from an annular plate 136. As illustrated, the arms 134 include inwardly directed angular projections 138 at their distal ends, see also FIG. 3. As illustrated in FIG. 4, the generally horizontal flange 122 is formed to define downwardly and outwardly directed angular projections 140 which match with and receive the projections 138 on the arms 134.

The horizontal flange 122 includes scallop cut-outs or notches 142 for conveniently mounting the reinforcement 132. In particular, the arms 134 are positioned around the annular plate 136 such that they align with the notches 142. Accordingly, the reinforcement 132 is positioned with its arms aligned with the notches 142 and moved downwardly into the spinner 118 as indicated by the arrow 144. Once fully received within the spinner 118, the reinforcement 132 is rotated to effect a bayonet mounting as indicated by the arrow 146. The reinforcement is rotated until holes 148 in the annular plate 136 align with holes 150 in the mounting hub 130. The reinforcement 132 is secured to the mounting hub 130 by bolts which pass through the aligned holes 148, 150 in the reinforcement 132 and the mounting hub 130, respectively.

Figure 3:
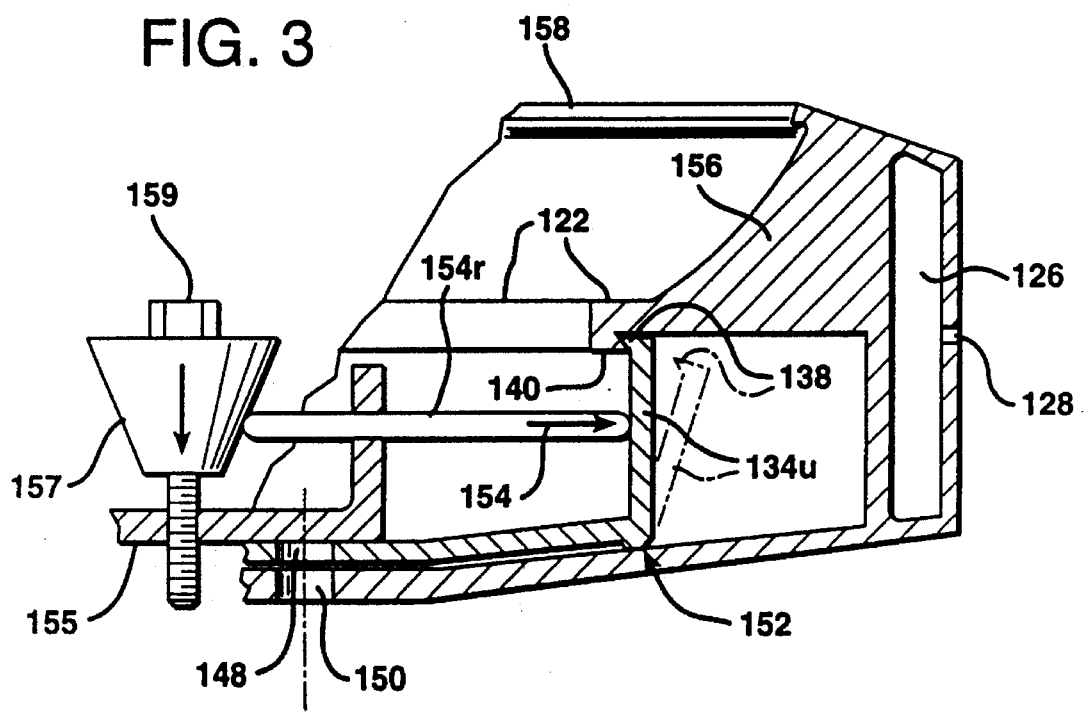
FIG. 3 is a schematic cross sectional view of a portion of a two-material rotating fiberizer/spinner including the invention of the present application.

The reinforcement 132 includes offset cams 152 at the base of each of the upwardly extending portions 134u of the arms 134, see FIG. 3. Accordingly, as bolts inserted through the holes 148, 150 are tightened to secure the reinforcement to the spinner 118, the upwardly extending portions 134u of the arms 134 are moved to exert radial inward forces on the horizontal flange 122 thereby reinforcing the spinner 118.

Alternately or in addition to the use of offset cams, the upwardly extending portions 134u of the arms 134 can be extended outwardly as indicated by the dotted line drawing in FIG. 3 prior to installation. Extending forces, indicated by a force arrow 154, may be applied by a series of rods 154r which are supported within a frame 155 secured to the reinforcement 132. The rods 154r are driven by a frusto-conical member 157 which is moved by means of a bolt 159 threadedly engaged with the frame 155. The extending forces are removed after installation to provide an interference fit and thereby the noted radial inward forces or to enhance or increase the forces provided by offset cams or otherwise. Other force-exerting apparatus can be used in the present invention to extend the upwardly extending portions 134u of the arms 134 as will be apparent to those skilled in the art.

While connection of the arms 134 to the annular plate 136 is currently preferred since it is believed to facilitate installation of the reinforcement 132, it should be apparent that individual arms could be used in the present invention as illustrated by the dotted lines through the annular plate 136 of FIG. 4. Advantageously, the use of individual arms would not require the scallops or notches 142 in the horizontal flange 122. Of course the same is true in the instance of an interference fit when the arms are expanded outwardly, placed in the spinner 118 and then released. Further, indentations, apertures or the like could be formed in the horizontal flange 122 in place of the angular projections 140 for either individual arms or the use of an interference fit.

In any event, the radially inward force contributed by the reinforcement 132 limits the creep and sag deflections during operation of the spinner 118 to maintain the fiber-forming environment for a longer time thus extending the life of the spinner. Further, since the fiber-forming environment is better stabilized, more consistent fibers can be produced by the spinner 118 for a longer period of time.

Figure 5:
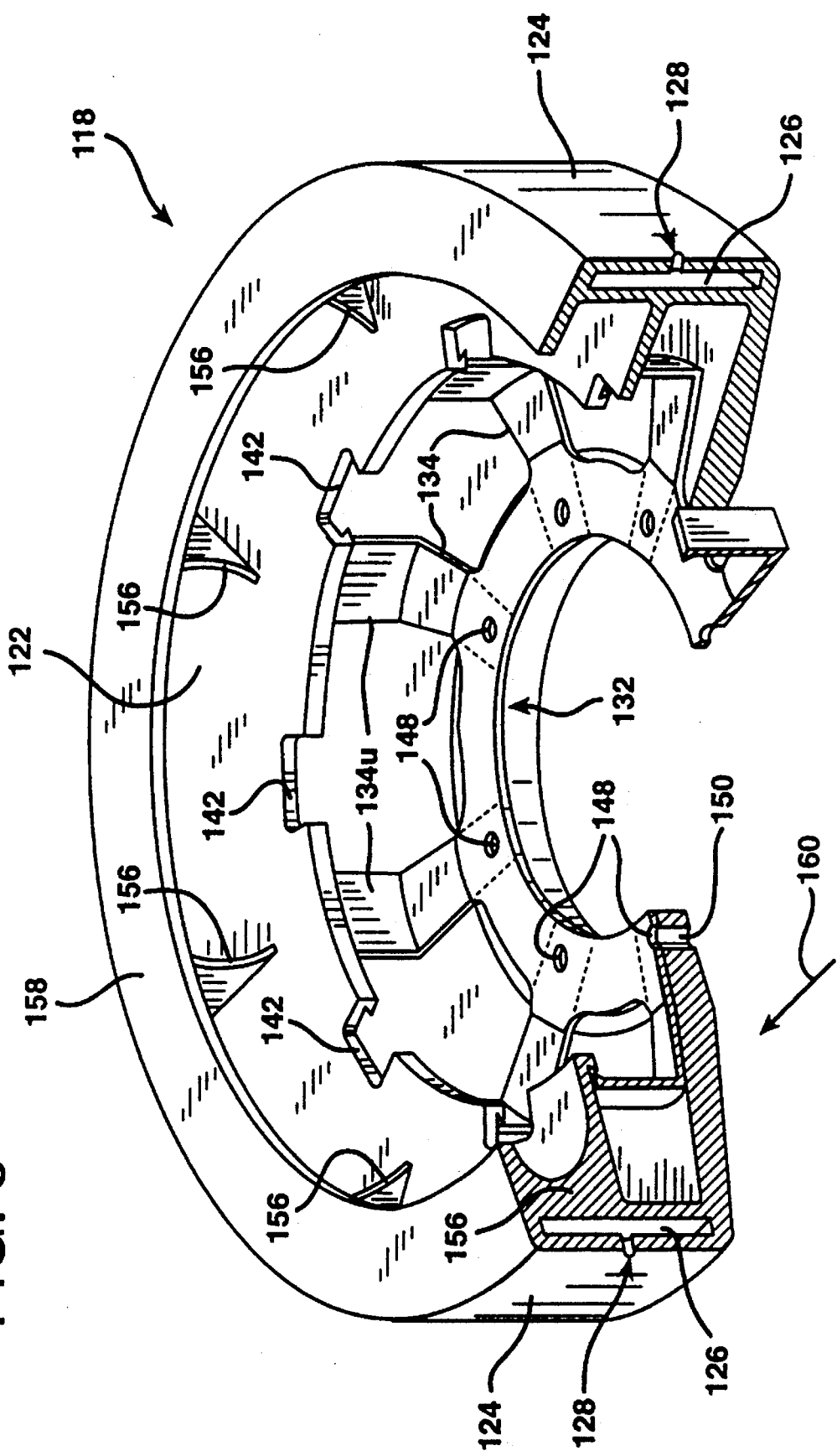
FIG. 5 is a partially cut-away perspective view of a two-material rotating spinner with the reinforcement installed therein further illustrating gussets extending between a generally horizontal flange positioned approximately midway on the spinner and an upper generally horizontal flange.

FIG. 5 illustrates, in partially cut-away perspective, a reinforcement 132 installed in a spinner 118 and ready to be secured thereto by bolts through aligned holes 148, 150. In addition, reinforcing gussets 156 have been added and extend between the generally horizontal flange 122 and an upper generally horizontal flange 158. The gussets 156 transfer the inward radial force exerted on the generally horizontal flange 122 to the upper generally horizontal flange 158 to better reinforce the spinner 118. In a working embodiment of the invention, the gussets were approximately 0.125 inch in thickness. Since all other elements of FIG. 5 are same as those of FIG. 4, they have been labeled with corresponding identifying numerals. The cross-sectional view taken along view line 160 corresponds substantially to a mirror image of the cross sectional view of FIG. 3.

Figure 2:
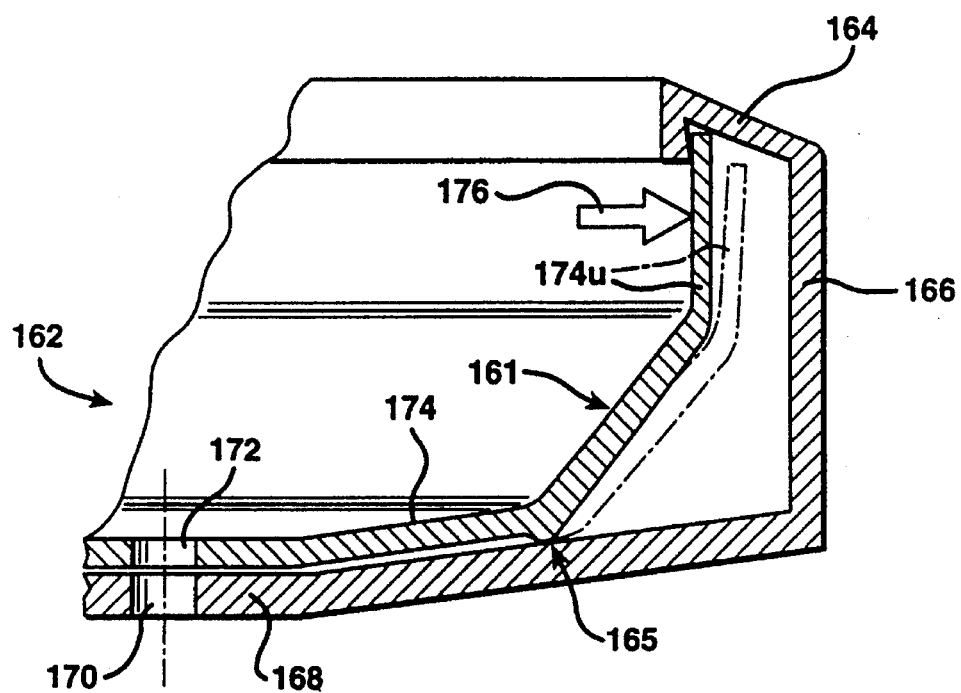
FIG. 2 is a schematic cross sectional view of a portion of a single-material rotating fiberizer/spinner including the invention of the present application.

FIG. 2 illustrates use of a reinforcement 161 in a single material spinner body or spinner 162, similar to the spinner 104. For this embodiment, the upper flange 164 extends from the top of an outer sidewall 166 of the spinner 162. The bottom wall 168 of the spinner 162 includes a series of holes represented by the hole 170 and matching holes 172 are formed in the reinforcement 161 if the reinforcement 161 is formed as an integral body as is the reinforcement 132. Of course individual arms could be used for this embodiment as well. Here again, scallops or notches can be formed in the upper flange 164 for bayonet mounting of an integrally formed reinforcement and offset cams 165 can be used to exert an inward radial force on the upper flange 164. Alternately or in addition, the upwardly extending portions 174u of the arms 174 can be extended outwardly as indicated by the dotted line drawing in FIG. 2 prior to installation. The extending force, indicated by the arrow 176, is removed after installation to provide an interference fit and thereby the noted radial inward force on the upper flange 164, or to enhance or increase the force provided by offset cams or otherwise.

Having thus described the invention of the present application in detail and by reference to preferred embodiments thereof, it will be apparent that modifications and variations are possible without departing from the scope of the invention defined in the appended claims.

I claim:

1. A spinner for receiving molten material and for generating fibers of said molten material by means of rotation of said spinner which comprises:

a spinner body having a bottom wall, an outer sidewall extending upwardly from the periphery of said bottom wall around a center of said spinner body, said outer sidewall having orifices through which molten material flows, and a generally horizontal flange extending inwardly from said outer sidewall; and a reinforcement secured to said bottom wall of said spinner and engaging said generally horizontal flange.

2. A spinner as claimed in claim 1 wherein said reinforcement is configured to exert an inward force on said generally horizontal flange toward said center of said spinner body.

3. A spinner as claimed in claim 2 wherein said reinforcement defines offset cams which operate to exert said inward force on said generally horizontal flange when said reinforcement is secured to said bottom wall of said spinner.

4. A spinner as claimed in claim 2 wherein said reinforcement is secured to said bottom wall in a prestressed state and exerts said inward force on said generally horizontal flange when said prestressed state is released.

5. A spinner as claimed in claim 1 wherein said generally horizontal flange extends from a top of said outer sidewall.

6. A spinner as claimed in claim 1 wherein said generally horizontal flange extends from near a center of said outer sidewall.

7. A spinner as claimed in claim 6 further comprising:

an upper generally horizontal flange extending from a top of said outer sidewall; and gussets extending between said generally horizontal flange and said upper generally horizontal flange.

8. A spinner as claimed in claim 7 wherein said reinforcement engages said generally horizontal flange at a plurality of locations around said generally horizontal flange and said gussets are positioned at said plurality of locations.

9. A spinner as claimed in claim 1 wherein said reinforcement comprises an annular plate secured to said bottom wall and a plurality of arms extending between said plate and said generally horizontal flange.

10. A spinner as claimed in claim 9 wherein said generally horizontal flange comprises a downwardly extended portion and is notched to receive said plurality of arms of said reinforcement, said reinforcement being rotated to engage said arms with said downwardly extended portion of said generally horizontal flange.

11. A spinner as claimed in claim 1 wherein said reinforcement comprises a plurality of arms extending between said bottom wall of said spinner and said generally horizontal flange.

12. A spinner for receiving molten material and for generating fibers of said molten material by means of rotation of said spinner which comprises:

a spinner body having a generally horizontal wall, an outer sidewall extending away from the periphery of said generally horizontal wall around a center of said spinner body, said outer sidewall having orifices through which molten material flows, and a generally horizontal flange spaced from said generally horizontal wall and extending inwardly from said outer sidewall; and a reinforcement secured to said generally horizontal wall of said spinner and engaging said generally horizontal flange.

* * * * *